US010655702B2

(12) United States Patent
Hamers et al.

(10) Patent No.: US 10,655,702 B2
(45) Date of Patent: May 19, 2020

(54) CONTROLLABLE VIBRATION DAMPER FOR MOTOR VEHICLES

(71) Applicant: ThyssenKrupp Bilstein GmbH, Ennepetal (DE)

(72) Inventors: Wolfgang Hamers, Jülich (DE); Ole Götz, Braunschweig (DE); Klaus Schmidt, Odenthal (DE); Dmitrij Smeljanskij, Leverkusen (DE)

(73) Assignee: THYSSENKRUPP BILSTEIN GMBH, Ennepetal (DE)

( * ) Notice: Subject to any disclaimer, the term of this patent is extended or adjusted under 35 U.S.C. 154(b) by 0 days.

(21) Appl. No.: 15/102,708

(22) PCT Filed: Dec. 17, 2014

(86) PCT No.: PCT/EP2014/003409
§ 371 (c)(1),
(2) Date: Jun. 8, 2016

(87) PCT Pub. No.: WO2015/090589
PCT Pub. Date: Jun. 25, 2015

(65) Prior Publication Data
US 2016/0312851 A1    Oct. 27, 2016

(30) Foreign Application Priority Data

Dec. 17, 2013 (DE) .......................... 10 2013 114 169

(51) Int. Cl.
*F16F 9/46* (2006.01)
*F16F 9/19* (2006.01)
*F16F 9/348* (2006.01)

(52) U.S. Cl.
CPC ............... *F16F 9/465* (2013.01); *F16F 9/19* (2013.01); *F16F 9/348* (2013.01); *F16F 9/3488* (2013.01);
(Continued)

(58) Field of Classification Search
CPC ........ F16F 9/348; F16F 9/3482; F16F 9/3484; F16F 9/3485; F16F 9/3488
See application file for complete search history.

(56) References Cited

U.S. PATENT DOCUMENTS 5,123,671 A * 6/1992 Driessen .............. B60G 17/018
188/266.5
5,234,085 A * 8/1993 Schneider ............... F16F 9/465
137/493.8
(Continued)

FOREIGN PATENT DOCUMENTS

CN    103210234 A    7/2013
CN    103443500 A    12/2013
(Continued)

OTHER PUBLICATIONS

English language machine translation of EP 0 616 146 A1.
(Continued)

*Primary Examiner* — Bradley T King
(74) *Attorney, Agent, or Firm* — thyssenkrupp North America, LLC.

(57) ABSTRACT

A controllable vibration damper may include a cylinder tube with hydraulic fluid, a piston movable axially within the cylinder tube along an axis and that divides the cylinder tube into two working spaces, a piston rod parallel to the cylinder tube axis and connected at one end to the piston, fluid passages from one working space into another working space, a first valve subassembly on a first fluid passage for damping piston movement in a first direction, and a second valve subassembly on a second fluid passage for damping piston movement in a second direction. Each valve subassembly may include a valve disk seated on a valve seat in a closed position and spaced apart from the valve seat in an open position, as well as a pilot chamber containing an adjustable pressure that pushes the valve disk into the closed
(Continued)

position. One of the pilot chambers may be delimited by a base, a cylindrical side wall fixed relative to the base and arranged coaxially with the cylinder tube axis, and a dimensionally stable cover that is held radially within the cylindrical side wall and can be moved parallel to the cylinder tube axis.

20 Claims, 3 Drawing Sheets

(52) U.S. Cl.
CPC ..... *F16F 2228/066* (2013.01); *F16F 2228/08* (2013.01)

(56) References Cited

U.S. PATENT DOCUMENTS

| | | | |
|---|---|---|---|
| 5,425,398 A | 6/1995 | Moradmand et al. | |
| 5,699,885 A * | 12/1997 | Forster | F16F 9/465 188/317 |
| 5,810,127 A | 9/1998 | Schmidt | |
| 6,264,015 B1 * | 7/2001 | De Kock | F16F 9/465 188/282.5 |
| 6,474,454 B2 * | 11/2002 | Matsumoto | F16F 9/3484 188/282.6 |
| 7,322,449 B2 * | 1/2008 | Yamaguchi | F16F 9/348 188/282.3 |
| 7,458,448 B2 * | 12/2008 | Katou | F16F 9/3485 188/282.6 |
| 7,694,785 B2 | 4/2010 | Nakadate | |
| 7,997,394 B2 * | 8/2011 | Yamaguchi | F16F 9/465 188/266.2 |
| 8,083,039 B2 * | 12/2011 | Vanbrabant | F16F 9/3488 188/322.14 |
| 8,584,818 B2 * | 11/2013 | Murakami | F16F 9/348 188/322.13 |
| 8,794,405 B2 * | 8/2014 | Yamashita | B60G 13/08 188/317 |
| 9,267,607 B2 | 2/2016 | FÖrster | |
| 9,297,437 B2 | 3/2016 | FÖrster | |
| 9,394,961 B2 | 7/2016 | Tanaka | |
| 2003/0106753 A1 | 6/2003 | Nezu et al. | |
| 2004/0188200 A1 * | 9/2004 | Katayama | F16F 9/465 188/322.15 |
| 2005/0263363 A1 | 12/2005 | Katou et al. | |
| 2012/0273311 A1 | 11/2012 | Beck | |
| 2016/0236533 A1 * | 8/2016 | Inagaki | B60G 17/08 |

FOREIGN PATENT DOCUMENTS

| | | |
|---|---|---|
| CN | 103511542 A | 1/2014 |
| DE | 37 04 712 A1 | 8/1988 |
| DE | 44 41 047 C1 | 1/1996 |
| DE | 101 04 640 C1 | 5/2002 |
| DE | 10257872 A1 | 7/2003 |
| EP | 0 616 146 A1 | 9/1994 |
| EP | 1 975 453 A2 | 10/2008 |
| EP | 2 444 688 A1 | 4/2012 |
| EP | 2 505 869 A2 | 10/2012 |
| JP | H02-278026 A | 11/1990 |
| WO | 2010/122102 A1 | 10/2010 |

OTHER PUBLICATIONS

English language machine translation of DE 101 04 640 C1.
Patent Abstracts of Japan for JP H02-278026 A.
English language machine translation of DE 37 04 712 A1.
International Search Report for PCT/EP2014/003409 dated Mar. 25, 2015 (dated Apr. 9, 2015).

* cited by examiner

CONTROLLABLE VIBRATION DAMPER FOR MOTOR VEHICLES

CROSS REFERENCE TO RELATED APPLICATIONS

This application is a U.S. National Stage Entry of International Patent Application Serial Number PCT/EP2014/003409, filed Dec. 17, 2014, which claims priority to German Patent Application No. DE 102013114169.2 filed Dec. 17, 2013, the entire contents of both of which are incorporated herein by reference.

FIELD

The present disclosure relates to vibration dampers that can be used in motor vehicles.

BACKGROUND

One type of vibration damper is known from DE 44 41 047 C1. Pressure-dependent damping valves are provided on a piston guided axially within a cylinder tube in order to allow fluid to be exchanged between two working spaces in the extension and compression stage. Pilot control is exercised in such a way that a controllable pressure is built up in pilot chambers. The pilot pressure pushes the valve disks of the damping valves toward the closed position thereof. By means of a bypass channel system, fluid is passed out of the working spaces into the pilot chambers, thus increasing the pressure there. The pilot pressure is controlled with the aid of an externally adjustable pilot valve arranged in the bypass channel system. An elastic element forms the division between the pilot chamber and the working space.

Another vibration damper, which operates on the same principle, is known from DE 101 04 640 C1. In this document, the pilot chambers are formed by pressure spaces. These pressure spaces are each formed by a pressure space housing and a seal, which rests movably on a damping valve.

WO 2010/122102 A1 discloses another vibration damper, which operates on the same principle. An upstream restrictor, through which hydraulic oil can flow into the bypass channel system, is embodied by a bore of fixed cross section in a housing part of the damping valve.

An upstream restrictor for a similar application is provided in U.S. Pat. No. 7,694,785 B2. This upstream restrictor is formed by a disk pack, by means of which the main damping valve is also formed.

However, the construction of the valve subassemblies of these vibration dampers is quite complex in some cases or requires specific components that, in some cases, are quite expensive to produce. Moreover, it is often not possible to change the characteristic only of individual functions of the damper in a selective manner for other areas of application simply by replacing individual components.

DETAILED DESCRIPTION

Figure 1:
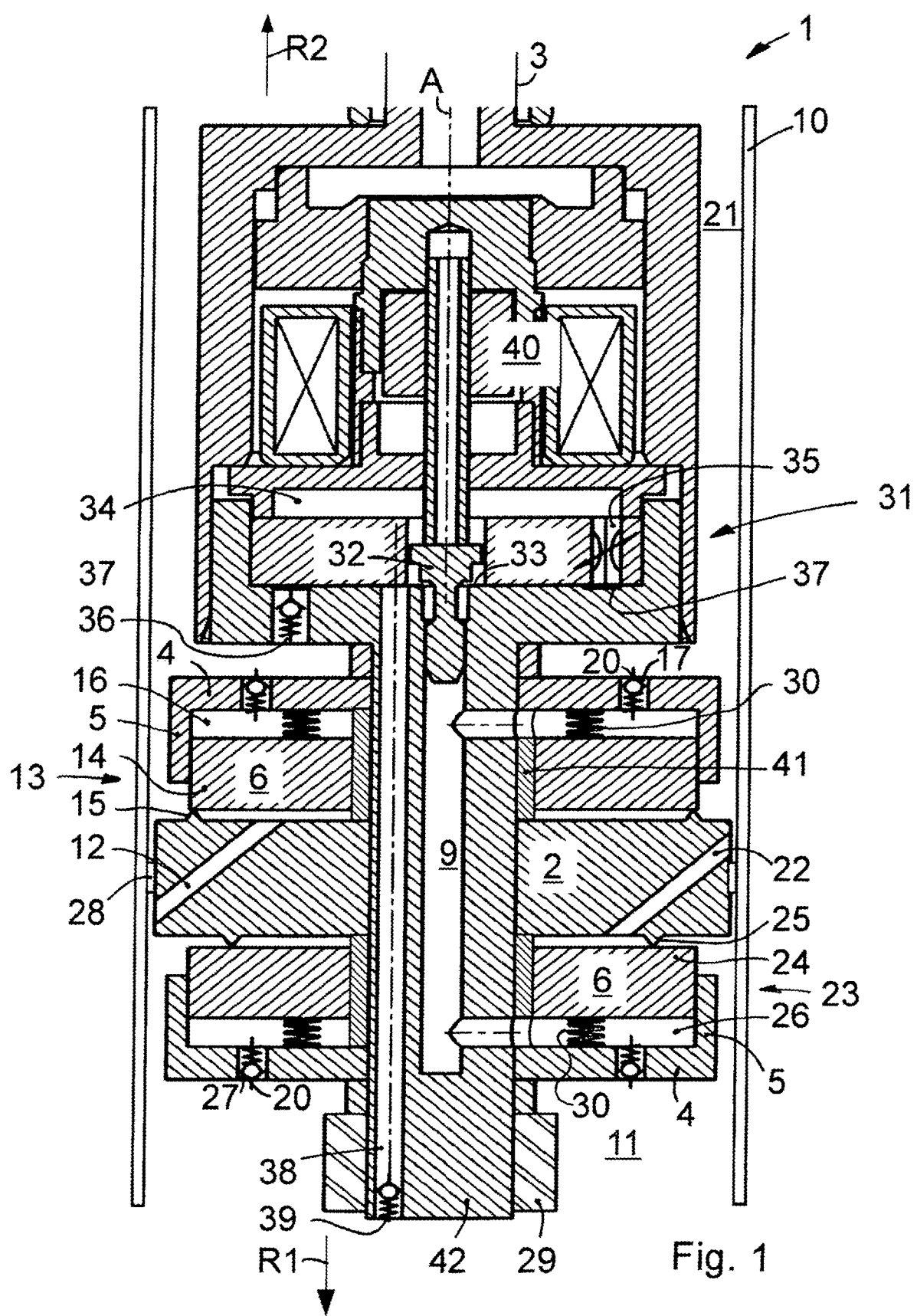
FIG. 1 is a cross-sectional view of an example vibration damper that includes an example valve subassembly.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

One example object of the present disclosure is to provide a vibration damper that has simplified valve subassemblies and, in particular, provides increased variability.

The object underlying the invention is achieved by a controllable vibration damper, in particular for a motor vehicle running gear assembly, comprising a cylinder tube, which has a hydraulic fluid sealed off therein, a piston, which can be moved axially within the cylinder tube along a cylinder axis and which divides the cylinder into two working spaces, a piston rod, which is aligned parallel to the cylinder axis and is connected at one end to the piston. A plurality of fluid passages from one working space into the other working space is provided in the piston. A first valve subassembly for damping the piston movement in a first actuating direction (e.g. during the compression stage) is arranged on a first fluid passage; a second valve subassembly for damping the piston movement in a second actuating direction (e.g. during the extension stage) is arranged on a second fluid passage. Each valve subassembly has at least one valve disk, which is seated on a valve seat in a closed valve position and thus covers the associated fluid passage and which is spaced apart at least partially from the valve seat in an open valve position.

Each valve subassembly comprises a pilot chamber, wherein a pressure in the pilot chamber pushes the valve disk into the closed valve position in addition to a spring force. The spring force profile, i.e. the force over the opening stroke, can be adjusted by means of spring washers and/or compression springs. In particular, this soft characteristic is set with the aid of the spring when there is no pressure in the pilot chamber.

The pressure in the respective pilot chambers is adjustable. The vibration damper according to the invention is characterized in that at least one, in particular both, of the pilot chambers is delimited by a base, a cylindrical side wall, which is fixed relative to the base and is arranged coaxially with the cylinder tube axis, and a dimensionally stable cover, which is held radially within the cylindrical side wall and can be moved parallel to the cylinder tube axis. Centrally, i.e. radially on the inside, the pilot chamber, of which, in particular, precisely one is provided per valve subassembly, is delimited by a cylindrical inner wall, in particular a sleeve or, alternatively, a fastening pin.

Within a valve subassembly, this arrangement results in a piston-cylinder system, wherein the cylinder is delimited by the cylindrical side wall and the base. The cover represents the piston. The cover is then acted upon axially, depending on the pressure in the pilot chamber. Owing to the axial action upon the piston, the pilot force is, in turn, exerted on the valve disk. It is also possible for the valve disk to be formed integrally with the cover. Especially when precisely one pilot chamber is provided per valve subassembly, the pilot chamber extends in a ring shape around the fastening pin. The cover is likewise of ring-shaped design and surrounds the fastening pin; axially on the outside, the cover is guided by the side wall. Consequently, the pilot chamber forms an annular cylinder and the cover forms an annular piston guided in the annular cylinder.

One significant advantage is that the required number of parts for a valve subassembly of this kind is significantly reduced as compared with known valve subassemblies with similar functionality. In this case, largely solid elements can be used to delimit the pilot chambers; the use of elastic construction elements for delimiting the pilot chamber, which fundamentally have high susceptibility to wear and are more sensitive, can be eliminated.

The base of at least one of the valve subassemblies together with the piston is preferably clamped on a fastening pin. In this case, the bases of the two pilot chambers and the piston can be arranged jointly on the fastening pin of the piston rod by means of a single screw joint. In particular, clamping is accomplished by means of a nut, which is screwed onto a thread of the fastening pin. The fastening pin is firmly connected to the piston rod. It is also possible for the fastening pin to be formed integrally with the piston rod.

In an axial region of the damper in which one of the covers is arranged, the supporting forces can be transmitted between the base and the piston with the aid of sleeves. Thus, in an advantageous embodiment, the base of one of the valve subassemblies is supported on the piston by means of a separate sleeve, wherein the sleeve is mounted around the piston rod. In another embodiment, a sleeve of this kind can be formed integrally with the base. In both embodiments, the sleeve can form the cylindrical inner wall of the pilot chamber.

The fundamental construction of this vibration damper according to the invention makes it possible for the vibration damper to be adapted to different specifications by exchanging a few components, in particular by exchanging the cover. This will become clearer in the course of the description below.

In a first preferred embodiment, the valve disk is formed by the dimensionally stable cover. Consequently, the cover is formed integrally with the valve disk. The cover itself then forms the valve disk. The valve disk can be released from the valve seat by an axial movement of the cover. Thus, the entire cover must be moved axially to transfer the valve disk to the open position.

In a second preferred embodiment, the valve disk is formed separately from the cover and is elastically deformable. The separate valve disk is arranged between the cover and the valve seat. The cover does not necessarily have to be moved to release the valve disk from the valve seat; the axial position of the cover and hence the action on the valve disk brought about by the cover influences the clamping characteristic.

The cover preferably has a control edge, with which the valve disk comes into contact on its axial side facing away from the valve seat, wherein the control edge is arranged radially further in than the valve seat. By virtue of its radial position, the control edge essentially defines the inflection point at which it becomes possible for the valve disk to yield to the pressure of the fluid in the fluid passage and rise from the valve seat. The radial position of the control edge, which, in particular, is designed so as to encircle the cylinder tube axis and preferably to run around in a ring shape of constant radius, thus has a significant influence on the characteristic of the valve subassembly and hence of the vibration damper.

Provision can be made for the valve disk to be free in the radial region of the control edge on the axial side which faces the valve seat. This makes it possible to put the valve disk under a certain preload through the action of the cover since it is subjected to bending stress by the opposite action between the valve seat and the control edge. By means of such a preload, it is possible, for example, to define a minimum pressure at which opening of the damping valve can take place.

In a preferred alternative, the cover has, instead of the control edge, a control surface, with which the valve disk comes into contact on its axial side facing away from the valve seat, wherein the axial distance between the control surface and the valve seat increases, when viewed radially from the inside outward, that is to say, in particular, with increasing radius. Here, the control surface has, in particular, a constant curvature, preferably having no steps therefore. In particular, at least part of the control surface is situated in a region which is arranged radially further in than the valve seat. By means of this control surface, it is possible to directly specify the exact form of movement of the valve disk when it is released from the valve seat. Here, the control surface forms a bearing surface on which the valve disk can rest in the open position. Thus, the control surface forms an extended stop for the valve disk. The characteristic of the vibration damper can be significantly influenced by the shape and position of the control surface.

In this case, the control surface preferably overlaps the valve seat radially on the outside. This means that the control surface also provides a contact surface for the valve disk in a region which is radially outside the valve seat. It is thus also possible to exercise a substantial degree of control over the movement of the valve disk, even radially at the outside.

In the first preferred embodiment, the pilot pressure now affects the damping force indirectly. In the versions of the second preferred embodiments with a separate valve disk, in contrast, control of the valve disk by the pilot pressure is performed indirectly, not directly. It is namely first of all the preloading of the valve disk which is influenced by the control edge or control surface. The preloading, in turn, then affects the restriction behavior. Thus, the flexible valve disk can provide a damping action and thus, in turn, damp unwanted pressure peaks in the pilot chamber and hence reduce disadvantageous force peaks on the overall vibration damper. The other pilot chamber of the inactive stage, in particular, which is connected to the pilot chamber of the active stage, however, then acts like a kind of damping reservoir. The avoidance of pressure peaks furthermore prevents the pilot valve opening too much due to such a pressure peak and, in turn, the pressure being reduced too quickly as a result. By means of the preloading, it is furthermore possible reliably to set a high damping force level since the free bending length of the valve disk can be deliberately shortened. At the same time, however, the dimensional stability of the cover ensures that the preloading of the valve disk can be adjusted in a highly dynamic way during operation.

It is essentially also possible for the cover to be of multipart design. Thus, the cover can have an attachment which carries the actual control edge or control surface.

A fluid passage is preferably provided between in each case one working space and one pilot chamber to enable the pilot chambers to be filled with hydraulic fluid, said passages each being provided with an upstream restrictor arrangement. This fluid passage makes it possible to use the pressure in the working spaces to build up the pilot pressure in the pilot chambers. Here, the upstream restrictor arrangement makes it possible to set the buildup of the pilot pressure specifically in accordance with the pressure in the associated working space.

It is preferred here that the upstream restrictor arrangement comprises a bypass disk, which provides an opening cross section which is smaller than a minimum opening cross section of the associated fluid passage. Irrespective of the embodiment of the fluid passage, it is thus possible to set the restricting effect largely through the choice of bypass disk. In contrast to conventional restrictors in this area of application, increased variability is obtained since the restricting effect can be adjusted simply by exchanging the bypass disk. The bypass disk can be provided with one or more radial notches which define the opening cross section.

The upstream restrictor arrangement furthermore preferably has a covering disk, which acts upon the bypass disk in the direction of an opening of the fluid passage, in particular over the entire surface of the bypass disk. In particular, the cover disk ensures that the bypass disk always rests firmly against the opening of the fluid passage. Thus, uncontrolled flexing of the bypass disk and hence opening of the restrictor, which can lead to unwanted oscillations in the restriction behavior, is prevented.

The bypass disk preferably rests on the base outside the pilot chamber. Thus, the bypass disk covers the opening on the side of the working space. The bypass disk is thus structurally decoupled from the components which delimit the pilot chamber or form the main damping valve itself. This makes it possible to use extremely simple components for the assembly of the upstream restrictor arrangement. Modifications to the pilot chamber, to the main damping valve or to the upstream restrictor arrangement can thus be made separately without necessarily entailing any effect on the other units.

The fluid passages can be parts of a bypass channel system through which the two pilot chambers are connected to one another. A first such fluid passage connects the second working space to the first pilot chamber; a second such fluid passage connects the first working space to the second pilot chamber. Such a fluid passage is preferably passed through the base which delimits the respective pilot chamber. The connection of the two pilot chambers can be accomplished by connecting passages, which, in particular, are introduced into the fastening pin.

The fluid passage is preferably closed by a one-way valve which, although it allows fluid to pass from the working space into the pilot chamber, prevents fluid from flowing back through the fluid passage from the pilot chamber into the working space or at least makes it considerably more difficult. The one-way valve can be formed by a valve disk which rests internally on the base in the pilot chamber and consequently covers an opening in the fluid passage on the inside of the pilot chamber. In particular, this valve disk forming the one-way valve can be mounted as a cantilever and pressed onto the base by a spring element. Use is preferably made of a spring element which also imposes a spring force in the direction of the valve seat on the cover. In particular, the check valve is arranged downstream of the upstream restrictor arrangement. As an alternative, the valve disk forming the one-way valve can be firmly clamped at its internal radius. The restoring force can be provided by the flexing valve disk itself.

Those having ordinary skill in the art will recognize that the example dampers disclosed herein can be adapted to new boundary conditions and applications by, for example, replacing the cover with a cover which, in particular, has a special control edge or a special control surface or by replacing valve disks in the region of the valve subassembly. Fundamentally, the construction proposed allows a strategy of using common parts.

With reference now to the figures, FIG. 1 shows the detail view of an example vibration damper 1 in cross section. The basic construction and operation described may also apply to the other examples shown in FIGS. 2a to 2c, unless stated otherwise.

The vibration damper 1 comprises a cylinder tube 10, in which a piston 2 is held so as to be movable along a cylinder tube axis A. On its outer circumference, the piston 2 has a ring seal 28, with the result that the piston 2 divides the cylinder tube 10 sealingly into a first working space 11 and a second working space 21. The piston 2 is secured on a fastening pin 42, which, in turn, is connected firmly to a piston rod 3. When the piston rod 3 is actuated in a first actuating direction R1 toward the first working space 11, the pressure in the first working space 11 increases. Fluid which is present in the first working space 11 is then passed through a first fluid passage 12 in the piston 2 into the second working space 21. During the passage of the fluid through the first fluid passage 12, the fluid flows through a first valve subassembly 13 having a valve disk 14. When a minimum pressure of the fluid in the first working space is reached, the first valve disk 14, which is seated with a preload on a first valve seat 15, is at least partially released from the first valve seat 15. Thus, the valve disk is transferred from the closed position to the open position. In this way, a hydraulic connection is established between the first working space 12 and the second working space 21. During this process, the first valve disk 14 acts as a restrictor in interaction with the first valve seat 15, thereby slowing the fluid. This leads to damping of the piston movement.

In the illustrative embodiment under consideration, the valve disk 14 is formed by a dimensionally stable cover 6 of a first pilot chamber 16. The dimensionally stable cover 6 is arranged so as to be axially movable relative to the fastening pin 42 and is acted upon in the direction of the valve seat 15 by a pilot pressure prevailing in the pilot chamber 16. This pilot pressure in the first pilot chamber 16 can be set in a defined manner during operation. The first pilot chamber 16 is furthermore formed by a base 4, which is connected firmly to the fastening pin 42. The first pilot chamber 16 is bounded laterally by a cylindrical side wall 5. In the center, the fastening pin 42 or sleeves 41, which are arranged around the fastening pin 42, form an internally cylindrical wall coaxially with the cylinder tube axis A. Instead of a sleeve, it is also possible for an inner wall that is formed so as to be fixed to the base 4 to be provided.

The first pilot chamber 16 thus forms an annular space which is arranged coaxially around the fastening pin 42. The cover 6 is pushed in the direction of the valve seat 15 by a return spring 30. It is evident that the damping force provided by the first valve subassembly 13 is all the greater, the higher the pressure (referred to as pilot pressure below) in the first pilot chamber 16.

The vibration damper 1 furthermore comprises a second valve subassembly 23, which is of identical configuration to the first valve subassembly 13. The second valve subassembly is provided for the purpose of slowing the flow of the fluid when the piston 2 is moved in a second actuating direction R2. In this case, the fluid flows from the second working space 21, via a second fluid passage 22, into the first working space 11. A second pilot chamber 26 is likewise formed by a base 4, a cylindrical side wall 5 and a dimensionally stable, axially movable cover 6. A second valve disk 24 and a second valve seat 25 are designed in a manner comparable to the first valve subassembly 13.

Figure 2:
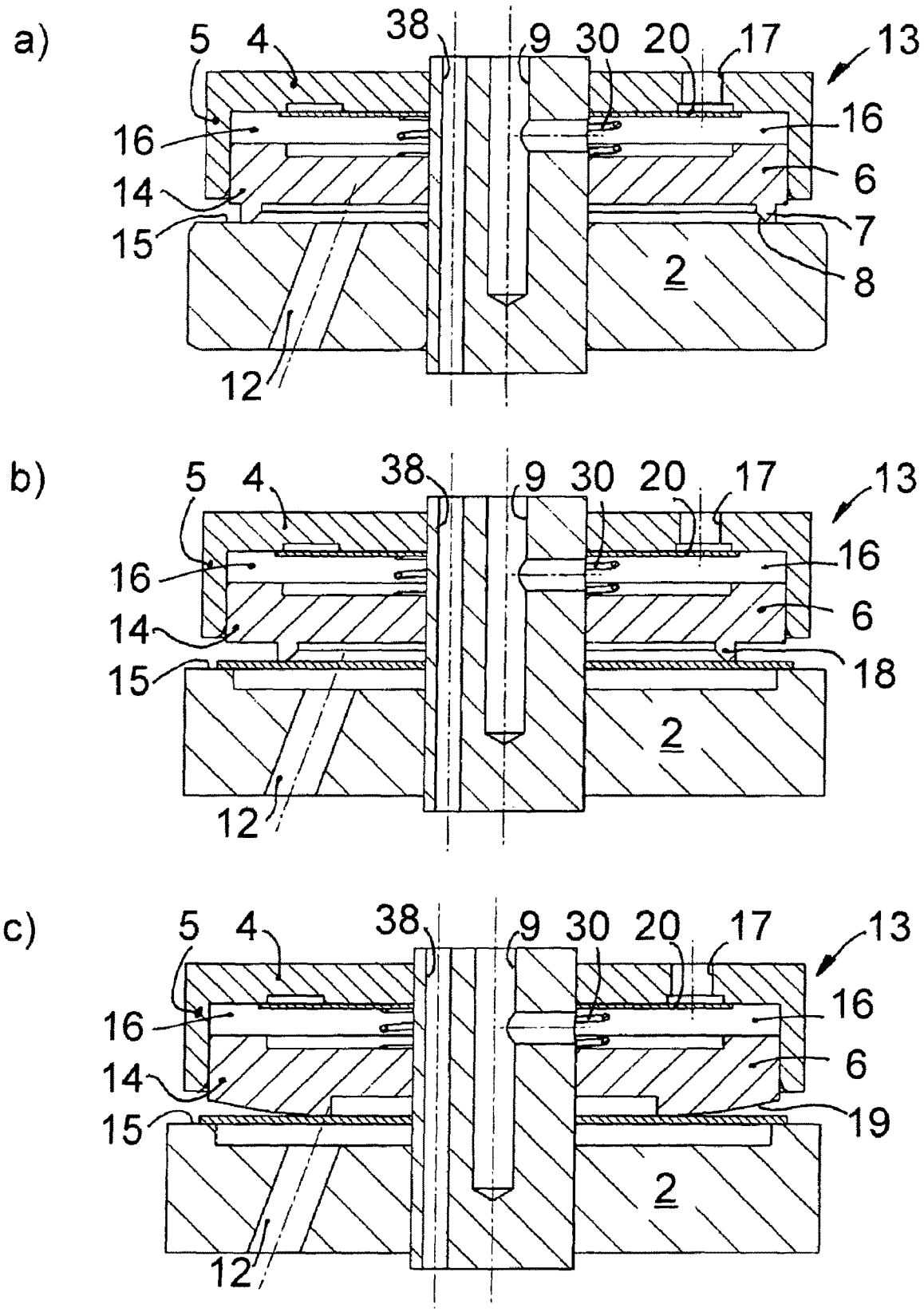
FIG. 2a is a cross-sectional detail view of an example valve subassembly for the vibration damper of FIG. 1.
FIG. 2b is a cross-sectional detail view of another example valve subassembly for the vibration damper of FIG. 1.
FIG. 2c is a cross-sectional view of still another example valve subassembly for the vibration damper of FIG. 1.

The two pilot chambers 16, 26 are connected hydraulically to one another by a connecting passage 9. The connecting passage 9 comprises an axial bore in the fastening pin 42 and two radial connecting bores in the fastening pin 42, each between the axial bore and the pilot chambers 16, 26. Essentially the same pressure prevails at all times in the two pilot chambers 16, 26. If the piston 2 is now moved in the first actuating direction R1, fluid flows out of the first working space 11 into the second pilot chamber 26 through a fluid passage 27 between the first working space 11 and the second pilot chamber 26, as a result of which the pilot pressure in the second pilot chamber 26 is increased. The pilot pressure built up in the second pilot chamber 26 also propagates into the first pilot chamber 16 through the connecting passage 9. As a result, the pilot pressure in the first pilot chamber 16 is produced, by means of which the damping behavior of the first valve subassembly 13 is influenced. The same applies to actuation in the second actuating direction R2. In this case, fluid is passed from the second working space 21 into the first pilot chamber 16 through a fluid passage 17 between the second working space 21 and the first pilot chamber 16. The pilot pressure which is produced in this way in the first pilot chamber 16 propagates, in turn, through the connecting passage 9 into the second pilot chamber 26. To ensure that the fluid cannot flow directly into the second working space 21 from the first pilot chamber 16 or into the first working space 11 from the second working chamber 26 through the fluid passages 17, 27, a one-way valve 20 is mounted in each of the fluid passages 17, 27. As shown in FIGS. 2a to c, this one-way valve 20 can be configured as a valve disk, which covers the fluid passage on the same side as the respective pilot chamber 16. A restrictor disk can be arranged between the valve disk which forms the one-way valve and the opening of the fluid passage (not shown).

The pilot pressure in the two pilot chambers 16 and 26 can be controlled. For this purpose, a pilot valve 31 is provided, said valve having a valve member 32. The valve member is held so as to be movable along the cylinder tube axis A and can be seated on a valve seat 33 that is fixed (relative to the fastening pin). When the valve member 32 is seated on the valve seat 33, fluid is largely prevented from flowing out through the pilot valve 31. During such a phase, the pilot pressure can be built up or held. Once the valve member 32 is released from the valve seat 33, fluid can flow out of the connecting passage through the pilot valve 31; in this phase, the pilot pressure can be reduced. During this process, the valve member 32 is acted upon in the first actuating direction R1 by means of a magnetic actuator 40. The valve member 32 is acted upon in the second actuating direction R2 by the pilot pressure. The position of the valve member 32 relative to the valve seat 33 then depends on the force ratios due to the magnetic actuator 40 and the pilot pressure.

When the piston rod is actuated in direction R1 (increased pressure in the first working space 11), the fluid flowing off through the pilot valve 31 flows to the second working space 21 through a second outflow passage 34. A restrictor 35 and a one-way valve 36 are also arranged in the second outflow passage 34. In this case, a one-way valve 36 prevents fluid from being able to flow out of the second working space 21 in the direction of the pilot chambers 16, 26 through the pilot valve 31. The restrictor 35 and the one-way valve 36 are arranged in different positions around the circumference and are connected hydraulically to one another by an annular channel 37.

When the piston rod 3 is actuated in direction R2 (increased pressure in the second working space 21), the fluid flowing off through the pilot valve 31 flows to the first working space 11 through a first outflow passage 38. The first outflow passage 38 is formed by an axial bore in the fastening pin 42. The one-way valve 36 prevents fluid flowing in the direction of the pilot chamber 16, 26 from the second working space 21 through the pilot valve 31. The first outflow passage 38 is formed by a further axial bore in the fastening pin 42. The one-way valve 39 is arranged in the first outflow passage 38.

FIG. 2a shows an alternative, second embodiment of the valve subassembly 13, which can also be applied to the second valve subassembly 23. The valve seat 15 is formed by a flat surface on the piston 2. The valve disk 14 is furthermore formed integrally with the cover 6. However, the valve disk 14 has a valve edge 7, which is formed in an encircling manner and is in contact with the valve seat 15 in the closed position. In this case, the valve edge 7 has an internally conical surface 8, which approaches the valve seat 15 axially in a radially outward direction.

FIG. 2b shows an alternative, third embodiment of the valve subassembly 13, which can also be applied to the second valve subassembly 23. The valve disk 14 is formed separately from the cover 6. The cover 6 acts upon the valve disk 14 in the direction of the closed position. The valve seat 15 is formed by an axial projection, which projects in a ring shape in the direction of the valve disk 14. The cover 6 furthermore has a control edge 18, which projects axially in the direction of the valve seat 15 and is likewise designed as an encircling ring. However, the control edge 18 is arranged radially further in than the valve seat 15. The loading of the valve disk 14 into the closed position therefore takes place further inward than the location where the valve seat 15 supports the valve disk 14. The support for the valve disk 14 by the valve seat 15 takes place radially further out. Thus, the valve disk is in each case free in the other direction where it is acted upon by the control edge 18 and the valve seat 15. By virtue of the radial offset between the control edge 18 and the valve seat, the valve disk is put under a preload in the closed position.

FIG. 2c shows an alternative, fourth embodiment of the valve subassembly 13, which can also be applied to the second valve subassembly 23. Instead of the control edge in the embodiment according to FIG. 2b, the cover 6 now has a control surface 19. This control surface 19 extends over a significantly wider radial area on the cover 6 than that covered by the control edge 18. In this case, the distance between the control surface 19 and the valve seat 15 increases, the further the position considered is radially toward the outside. The control surface 19 determines the maximum deflection of the valve disk 14 during opening. The opening characteristic can be determined by individual configuration of the control surface.

The valve subassemblies described with reference to FIGS. 2a to 2c can be installed in the vibration damper 1 shown in FIG. 1 instead of the valve subassemblies 13 and 23 shown there.

Figure 3:
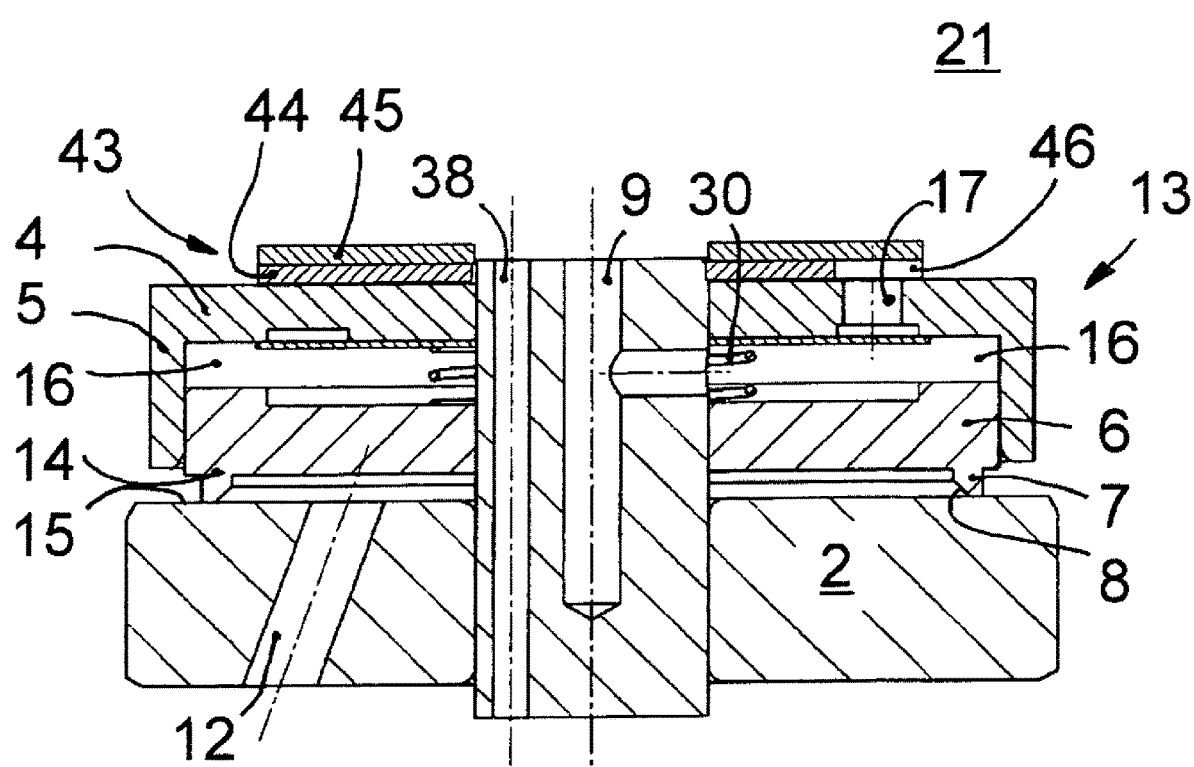
FIG. 3 is a cross-sectional view of an example valve subassembly in an example according to FIG. 2a supplemented with an upstream restrictor arrangement.

In FIG. 3, the vibration damper is shown in an embodiment according to FIG. 2a. It is supplemented by an upstream restrictor arrangement 43. The upstream restrictor arrangement 43 comprises a bypass disk 44, which rests on the base 4 on the same side as the working space, i.e. outside the working chamber 16, and partially covers an opening of the fluid passage 17. Resting on the bypass disk 44 there is, in turn, a cover disk 45, which pushes the bypass disk 44 onto the base 4. To enable fluid to flow through the upstream restrictor arrangement 43, the bypass disk 44 has a radial notch 46, which is arranged at the same position on the circumference as the opening of the fluid passage 17. Through the radial notch 46, the hydraulic fluid can flow into the fluid passage 17 from the working space. The opening cross section provided by the radial notch 46 is smaller than the cross section formed by the fluid passage 17. Thus, the restricting effect on the fluid flowing in through the fluid passage 17 is brought about solely by the upstream restrictor arrangement 43 without the occurrence of a further significant pressure drop in the fluid passage 17 itself. The restricting effect can be adjusted simply by exchanging the disks of the upstream restrictor arrangement 43.

The embodiment of the upstream restrictor arrangement 43 according to FIG. 3 can be readily applied to the embodiments according to FIGS. 1, 2b and 2c and furthermore also to the other valve subassembly 23, which is not shown.

The possibility of installing different forms of the control edges 8 or control surface 9 by the very simple process of exchanging the cover 6 or the valve disks 14, 24, and the replacement of parts of the upstream restrictor arrangement 43 provides versatility in the adjustment of the basic damping characteristic in addition to the dynamic adjustability via the pilot pressure. The adjustments can be performed in such a way that the characteristics of the other functional units are as far as possible unaffected.

What is claimed is:

1. A controllable vibration damper comprising:
   a cylinder tube that has hydraulic fluid sealed off therein, the cylinder tube having a cylinder tube axis;
   a piston axially movable within the cylinder tube along the cylinder tube axis, the piston dividing the cylinder tube into two working spaces;
   a piston rod aligned parallel to the cylinder tube axis and connected at one end to the piston;
   first and second fluid passages extending between the two working spaces in the piston;
   a first valve subassembly for damping movement of the piston in a first actuating direction, wherein the first valve subassembly is disposed on the first fluid passage;
   a second valve subassembly for damping movement of the piston in a second actuating direction, wherein the second valve subassembly is disposed on the second fluid passage, wherein each of the first and second valve subassemblies comprises:
      a valve disk including a single dimensionally stable cover of an elastically non-deformable, single piece construction configured to move parallel to the cylindrical axis so as to be seated on a valve seat in a closed valve position so as to cover the respective fluid passage and spaced apart from the valve seat in an open valve position, and
      a pilot chamber wherein the valve disk is preloadable into the closed valve position by pressurization of the pilot chamber, wherein a pressure of the pilot chamber is adjustable,
   wherein the pilot chamber of at least one of the first valve subassembly or the second valve subassembly is delimited by a base, a cylindrical side wall that is fixed relative to the base, and wherein the dimensionally stable cover is held radially within the cylindrical side wall, wherein the base and cylindrical sidewall are formed as a single piece construction, wherein an outer lateral face and an inner lateral face of at least one of the single dimensionally stable covers of elastically non-deformable, single piece construction form fluid-tight seals, with one of the fluid-tight seals being formed between the outer lateral face and the cylindrical sidewall.

2. The controllable vibration damper of claim 1 wherein the base of the at least one of the first valve subassembly or the second valve subassembly together with the piston is clamped on a fastening pin.

3. The controllable vibration damper of claim 1 wherein the valve disk is formed separately from the dimensionally stable cover and is elastically deformable, with the valve disk being disposed axially between the dimensionally stable cover and the valve seat.

4. The controllable vibration damper of claim 3 wherein the dimensionally stable cover comprises a control edge with which the valve disk comes into contact on its axial side facing away from the valve seat, wherein the control edge is disposed radially further in than the valve seat.

5. The controllable vibration damper of claim 3 wherein the valve disk is free in a radial region of the control edge on an axial side that faces the valve seat.

6. The controllable vibration damper of claim 3 wherein the dimensionally stable cover includes a control surface with which the valve disk comes into contact on its axial side facing away from the valve seat, wherein an axial distance between the control surface and the valve seat increases when viewed radially from an inside outward.

7. The controllable vibration damper of claim 6 wherein the control surface overlaps the valve seat radially on an outside.

8. The controllable vibration damper of claim 1 further comprising:
   a third fluid passage between a first of the two working spaces and the pilot chamber of the first valve subassembly; and
   a fourth fluid passage between a second of the two working spaces and the pilot chamber of the second valve subassembly, wherein the third and fourth fluid passages enable the pilot chambers to be filled with hydraulic fluid, wherein each of the third and fourth fluid passages includes an upstream restrictor arrangement.

9. The controllable vibration damper of claim 8 wherein each upstream restrictor arrangement comprises a bypass disk that includes an opening cross section that is smaller than a minimum opening cross section of the respective fluid passage.

10. The controllable vibration damper of claim 9 wherein each upstream restrictor arrangement comprises a covering disk that acts upon the bypass disk in a direction of an opening of the respective fluid passage.

11. The controllable vibration damper of claim 9 wherein the bypass disk rests on the base outside the pilot chamber.

12. The controllable vibration damper of claim 1 wherein the dimensionally stable cover that is held radially within the cylindrical side wall is in direct contact with the cylindrical side wall.

13. The controllable vibration damper of claim 1 wherein the dimensionally stable cover is slidably engaged with the cylindrical side wall.

14. The controllable vibration damper of claim 1 wherein the pilot chamber is selectively adjustable.

15. The controllable vibration damper of claim 1 wherein the dimensionally stable cover is solid except for an aperture disposed through a center of the dimensionally stable cover.

16. The controllable vibration damper of claim 1 further comprising a sleeve and a fastening pin that are disposed along or parallel to the cylinder tube axis, wherein the sleeve is disposed around the fastening pin, wherein the dimensionally stable cover is disposed between the sleeve and the cylindrical side wall.

17. The controllable vibration damper of claim 1 further comprising a return spring that exerts a force on the valve disk that biases the valve disk into the closed position, wherein the return spring is in direct contact with the valve disk.

18. The controllable vibration damper of claim 1 wherein an axial movement of the valve disk of the first valve subassembly in a first direction from the closed valve position to the open valve position permits hydraulic fluid to flow from a first of the two working spaces to a second of the two working spaces, wherein an axial movement of the valve disk of the second valve subassembly in a second direction from the closed valve position to the open valve position permits hydraulic fluid to flow from the second of the two working spaces to the first of the two working spaces, wherein the first direction is away from the valve disk of the second valve subassembly, wherein the second direction is away from the valve disk of the first valve subassembly.

19. The controllable vibration damper of claim 1 comprising a connecting passage that hydraulically connects the pilot chamber of the first valve subassembly to the pilot chamber of the second valve subassembly.

20. The controllable vibration damper of claim 19 wherein by way of the connecting passage the pressure of the pilot chamber of the first valve subassembly is substantially equal to the pressure of the pilot chamber of the second valve subassembly.

* * * * *